(12) United States Patent
Israelsson et al.

(10) Patent No.: US 10,994,495 B2
(45) Date of Patent: May 4, 2021

(54) SEALING DEVICE WITH INCREASED ROBUSTNESS

(71) Applicant: Tetra Laval Holdings & Finance S.A., Pully (CH)

(72) Inventors: Karl Israelsson, Malmö (SE); Daniel Sandberg, Lund (SE); Sebastian Heinonen, Bjärred (SE); Raul Padilla, Staffanstorp (SE); Karl-Axel Johansson, Löddeköpinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 172 days.

(21) Appl. No.: 15/779,298

(22) PCT Filed: Nov. 15, 2016

(86) PCT No.: PCT/EP2016/077780
§ 371 (c)(1),
(2) Date: May 25, 2018

(87) PCT Pub. No.: WO2017/089187
PCT Pub. Date: Jun. 1, 2017

(65) Prior Publication Data
US 2018/0345592 A1    Dec. 6, 2018

(30) Foreign Application Priority Data
Nov. 27, 2015   (SE) .................... 1551548-9

(51) Int. Cl.
*B29C 37/00* (2006.01)
*H05B 6/36* (2006.01)
(Continued)

(52) U.S. Cl.
CPC ...... *B29C 66/4312* (2013.01); *B29C 37/0085* (2013.01); *B29C 65/368* (2013.01);
(Continued)

(58) Field of Classification Search
CPC ............ B29C 66/4312; B29C 37/0085; B29C 65/3656; B29C 65/3668; B29C 65/368;
(Continued)

(56) References Cited

U.S. PATENT DOCUMENTS 3,721,534 A    3/1973   Kubick
3,808,074 A    4/1974   Smith et al.
(Continued)

FOREIGN PATENT DOCUMENTS

CH    676958 A5    3/1991
CN    102181156 A    9/2011
(Continued)

OTHER PUBLICATIONS

Davis, J.R.; "Practical Design Guidelines for Surface Engineering" Chapter 8, Surface Engineering for Corrosion and Wear Resistance, ASM International, Mar. 2001; eISBN: 9781615030729, pISBN: 9780871707000; pp. 195-229.
(Continued)

*Primary Examiner* — Brian W Jennison
(74) *Attorney, Agent, or Firm* — Knobbe, Martens, Olson & Bear, LLP

(57) ABSTRACT

An improved induction sealing device (300) is presented. The device (300) comprises a main body (302), a magnetic field concentrator (306) held in said main body (302) and a conductive element (304). One or several protrusions (314*a*, 314*b*) of said magnetic field concentrator (306) cooperate with one or several indentations or openings (312*a*, 312*b*) in said main body (302) such that said magnetic field concentrator (306) and said main body (302) is securely bonded together.

13 Claims, 6 Drawing Sheets

(51) Int. Cl.
  *B29C 65/00* (2006.01)
  *B29C 65/36* (2006.01)
  *B29C 65/74* (2006.01)
  *B65B 51/22* (2006.01)
  *H05B 6/10* (2006.01)
  *B65B 51/30* (2006.01)
  *B65B 9/20* (2012.01)
  *B29C 65/08* (2006.01)
  *B29L 31/00* (2006.01)
  *B29K 705/02* (2006.01)

(52) U.S. Cl.
  CPC ...... *B29C 65/3656* (2013.01); *B29C 65/3668* (2013.01); *B29C 65/7451* (2013.01); *B29C 66/1122* (2013.01); *B29C 66/72321* (2013.01); *B29C 66/83543* (2013.01); *B29C 66/849* (2013.01); *B65B 9/2049* (2013.01); *B65B 51/227* (2013.01); *B65B 51/30* (2013.01); *B65B 51/306* (2013.01); *H05B 6/105* (2013.01); *H05B 6/365* (2013.01); *B29C 65/08* (2013.01); *B29C 66/4322* (2013.01); *B29C 66/4742* (2013.01); *B29C 66/8122* (2013.01); *B29K 2705/02* (2013.01); *B29K 2995/0008* (2013.01); *B29L 2031/7166* (2013.01)

(58) Field of Classification Search
  CPC . B29C 65/7451; B29C 65/66; B29C 65/1122; B29C 66/72321; B29C 66/83543; B29C 66/849; B29C 65/08; B29C 66/4322; B29C 66/4742; B29C 66/8122; H05B 6/105; H05B 6/365; B29K 2705/02; B29K 2995/0008
  See application file for complete search history.

(56) References Cited

U.S. PATENT DOCUMENTS

| | | | |
|---|---|---|---|
| 3,864,186 A | 2/1975 | Balla | |
| 4,169,004 A | 9/1979 | Kock et al. | |
| 4,506,125 A | 3/1985 | Smets et al. | |
| 4,704,509 A | 11/1987 | Hilmersson et al. | |
| 4,757,175 A | 7/1988 | Mohr et al. | |
| 4,776,980 A | 10/1988 | Ruffini | |
| 4,808,326 A | 2/1989 | Tanino et al. | |
| 5,250,140 A | 10/1993 | Hayashi et al. | |
| 5,418,069 A | 5/1995 | Learman | |
| 5,418,811 A | 5/1995 | Ruffini et al. | |
| 5,588,019 A | 12/1996 | Ruffini et al. | |
| 5,649,407 A | 7/1997 | Blomqvist | |
| 5,714,033 A | 2/1998 | Hayashi et al. | |
| 5,889,263 A * | 3/1999 | Andersson | B29C 65/3656 219/633 |
| 5,968,399 A | 10/1999 | Selberg | |
| 6,167,681 B1 | 1/2001 | Yano et al. | |
| 6,216,420 B1 | 4/2001 | Mazzetto et al. | |
| 6,503,963 B2 | 1/2003 | Toyoda et al. | |
| 6,837,025 B2 | 1/2005 | Kume | |
| 7,002,117 B2 | 2/2006 | Thomasset | |
| 7,003,934 B1 | 2/2006 | Yano | |
| 8,572,936 B2 | 11/2013 | Mancin et al. | |
| 8,839,597 B2 | 9/2014 | Babini et al. | |
| 9,352,869 B2 | 5/2016 | Babini et al. | |
| 9,545,751 B2 | 1/2017 | Hull | |
| 10,414,098 B2 | 9/2019 | Aurand et al. | |
| 2002/0108705 A1* | 8/2002 | Kume | B29C 66/72341 156/251 |
| 2003/0116886 A1 | 6/2003 | Nakazawa | |
| 2004/0045635 A1 | 3/2004 | Bandyopadhyay et al. | |
| 2004/0060928 A1* | 4/2004 | Balla | B29C 65/368 219/672 |
| 2004/0182046 A1 | 9/2004 | Babini et al. | |
| 2006/0124626 A1* | 6/2006 | Kupfer | B65B 51/227 219/243 |
| 2006/0154052 A1 | 7/2006 | Waffenschmidt et al. | |
| 2009/0101286 A1 | 4/2009 | Sumeer et al. | |
| 2010/0025391 A1 | 2/2010 | Palombini et al. | |
| 2010/0155390 A1 | 6/2010 | Hirota | |
| 2010/0180545 A1 | 7/2010 | Palmquist et al. | |
| 2011/0030315 A1 | 2/2011 | Mancin et al. | |
| 2011/0094672 A1 | 4/2011 | Wijk et al. | |
| 2013/0263556 A1 | 10/2013 | Babini et al. | |
| 2016/0297121 A1* | 10/2016 | Palmquist | B29O 66/81433 |
| 2017/0240309 A1 | 8/2017 | Rubini et al. | |
| 2018/0272620 A1 | 9/2018 | Persson | |

FOREIGN PATENT DOCUMENTS

| | | |
|---|---|---|
| CN | 105073368 A | 11/2015 |
| EP | 0223517 A2 | 5/1987 |
| EP | 0225392 A1 | 6/1987 |
| EP | 0484998 A1 | 5/1992 |
| EP | 0653899 A2 | 5/1995 |
| EP | 0730946 A2 | 9/1996 |
| EP | 1066951 A2 | 1/2001 |
| EP | 1107358 A2 | 6/2001 |
| EP | 1231149 A1 | 8/2002 |
| EP | 1234771 A1 | 8/2002 |
| EP | 1241098 A1 | 9/2002 |
| EP | 1300340 A1 | 4/2003 |
| EP | 1541641 A | 6/2005 |
| EP | 2008795 A1 | 12/2008 |
| EP | 2236270 A1 | 10/2010 |
| EP | 2468480 A1 | 6/2012 |
| EP | 2781325 A1 | 9/2014 |
| EP | 3000584 A1 | 3/2016 |
| FR | 2776616 A1 | 10/1999 |
| GB | 2506681 A | 4/2014 |
| JP | S57148619 A | 9/1982 |
| JP | S63-187591 A | 8/1988 |
| JP | S63-258729 A | 10/1988 |
| JP | H04-154564 A | 5/1992 |
| JP | H08-244728 A | 9/1996 |
| JP | H09-077006 A | 3/1997 |
| JP | H10-321361 | 12/1998 |
| JP | H11-43115 A | 2/1999 |
| JP | 2000127198 | 5/2000 |
| JP | 2004-228043 A | 8/2004 |
| SE | 434240 B | 7/1984 |
| WO | WO 1992/015182 A1 | 9/1992 |
| WO | WO 1997/14547 A1 | 4/1997 |
| WO | WO 2001/085827 A3 | 11/2001 |
| WO | WO 2003/053626 A2 | 7/2003 |
| WO | WO 2003/097332 A1 | 11/2003 |
| WO | WO 2005/004560 A1 | 1/2005 |
| WO | WO 2005/105579 A1 | 11/2005 |
| WO | WO 2007/008131 A2 | 1/2007 |
| WO | WO 2012/019925 A1 | 2/2012 |
| WO | WO 2013/045254 A1 | 4/2013 |
| WO | WO 2014/072477 A1 | 5/2014 |
| WO | WO 2014/166765 A1 | 10/2014 |
| WO | WO 2015/036222 A1 | 3/2015 |
| WO | WO 2015/040173 A1 | 3/2015 |
| WO | WO 2015/158502 A1 | 10/2015 |
| WO | WO 2016/083212 A1 | 6/2016 |
| WO | WO 2016/132986 A1 | 8/2016 |
| WO | WO 2017/089186 A1 | 6/2017 |
| WO | WO 2017/089187 A1 | 6/2017 |

OTHER PUBLICATIONS

European Search Report for Application No. 16167841.2, dated Nov. 11, 2016.
European Search Report for Application No. 17181917 dated Jan. 23, 2018, in 8 pages.
International Search Report and Written Opinion for Application No. PCT/EP2015/056173, dated Aug. 6, 2015.
International Search Report and Written Opinion for Application No. PCT/EP2015/056329, dated Sep. 5, 2014.

(56) References Cited

OTHER PUBLICATIONS

International Search Report and Written Opinion for Application No. PCT/EP2017/060146, dated Jul. 18, 2017.
International Search Report and Written Opinion for Application No. PCT/EP2018/068223, dated Sep. 10, 2018.
International Search Report and Written Opinion for Application No. PCT/EP2018/068224, dated Sep. 21, 2018.
International Search Report and Written Opinion for PCT/EP2015/076983, dated Feb. 15, 2016.
International Search Report for Application No. PCT/EP2015/062906, dated Aug. 7, 2015.
Leschynsky et al "Layered Alloys for Effective Magnetic Flux Concentration in Induction Heating," Materials Science-Poland, vol. 25, No. 2, 2007.
Office Action in European Application No. 14713137 dated Jun. 26, 2018 in 9 pages.
Office Action in Japanese Application No. 2016-562918, dated Mar. 5, 2019.
Office Action received in Chinese Application No. 201580031130.4 dated Jun. 15, 2018 in 19 pages.
Office Action for Swedish Application No. 1551548-9 dated May 30, 2016 in 5 pages.
Search Report for International Application No. PCT/EP2016/077779 dated Feb. 27, 2017 in 5 pages.
Search Report for International Application No. PCT/EP2016/077780 dated Feb. 28, 2017 in 5 pages.
Office Action in Chinese Application No. 108290352, date Jan. 24, 2019, in 5 pages.
Office Action received in Japanese Application No. 2018-527141, dated Oct. 16, 2018, in 5 pages.
European Search Report received in Application No. 17181581.4, dated Jan. 16, 2018, in 7 pages.
European Search Report received in Application No. 17184954, dated Jan. 22, 2018, in 6 pages.
Search Report and Written Opinion received in International Application No. PCT/EP2018/070595, dated Sep. 21, 2018, in 10 pages.

\* cited by examiner

SEALING DEVICE WITH INCREASED ROBUSTNESS

TECHNICAL FIELD

The invention generally relates to the field of packaging. More particularly, the invention relates to an induction sealing device used, for instance, when making transversal sealings in a roll-fed packaging machine.

BACKGROUND

Carton based packages for liquid food products are well known in most parts of the world. For instance, Tetra Brik® packages are used in many parts of the world for milk, juice and other beverages. There are several reasons why carton based packages have gained such popularity. The environmental benefits of the packages, e.g. that the packages are to a large extent is produced by renewable material, and the efficient logistics of brick shaped packages, are some examples to this popularity and also a reason why consumers today choose carton based packages instead of plastic bottles. Another reason why carton based packages are popular is that the filling machines producing the packages are cost efficient compared to other alternatives and that the total cost for running a carton based filling machine is very competitive.

There are generally two different types of filling machines for carton packages, blanks fed packaging machines and roll fed packaging machines. For blanks fed packaging machines, blanks, being pieces of packaging material with two ends welded together such that a folded sleeve is formed, are fed to the filling machine, erected into an open sleeve, folded and sealed such that bottoms are formed, filled with product and sealed and folded such that a package filled with product is achieved. For roll fed packaging machines a tube is formed from a web of packaging material by continuously directing the web and making a longitudinal sealing. The tube is filled with product and then by making successive transversal sealings and cuttings in a lower end of the tube, packages are formed. By providing means for holding the tube in position during the transversal sealing and cutting, and by providing subsequent folding means different forms may be obtained.

In order to do the transversal sealing, sometimes also referred to as non-continuous sealing, different technologies can be used. A today commonly used technology is so-called induction heat sealing, or sometimes only induction sealing. The general principle of this technology is to induce a current in an Aluminum foil in the packaging material such that heat is generated and as an effect of this that plastic layers in the packaging material melt at the same time as two different sides of the packaging material are pressed together such that the sealing, or sometimes also referred to as welding, is achieved. If the packaging material does not comprise Aluminum foil different technologies are used, such as ultrasonic sealing in which ultrasound is used for melting the plastic layers such that a sealing can be achieved.

A sealing device for induction sealing usually comprises a support body, at least one conductive element, e.g. a coil, held in the support body and a magnetic insert, sometimes referred to as magnetic field concentrator (MFC), placed in the support body next to the conductive element in order to provide for that the electromagnetic field is directed towards the packaging material, such that a more efficient sealing is achieved.

Even though induction sealing devices have been used for a long time there is still a need to improve these in terms of wear resistance, both due to the forces used when providing the pressure, but also due to e.g. hydrogen peroxide or other chemical used for sterilizing the package material, and to be able to produce the inductors in a cost efficient manner.

SUMMARY

Accordingly, the presented devices and methods preferably seek to mitigate, alleviate or eliminate one or more of the above identified deficiencies in the art and disadvantages singly or in combination and solves at least the above mentioned problems according to any one of the aspects below.

According to a first aspect it is provided an induction sealing device comprising a main body, a magnetic field concentrator held in said main body, a conductive element, wherein one or several protrusions of said magnetic field concentrator cooperate with one or several indentations or openings in said main body such that said magnetic field concentrator and said main body is securely bonded together.

The magnetic field concentrator may be made by injection molding and said main body may serve as a mold during said injection molding.

The at least one or several openings in said main body may be used for gating material for forming said magnetic field concentrator into an interior of said main body.

The main body may be an elongated body, wherein said at least one or several openings are placed in approximately the middle of said elongated body.

The main body may be an elongated body, wherein said at least one or several openings are placed in outer ends of said elongated body.

The main body may be provided with a cut out in a mid section.

The one or several protrusions of said magnetic field concentrator may cooperate with one or several indentations or openings of said conductive element such that said magnetic field concentrator and said conductive element is securely bonded together.

The device may further comprise a protective element, wherein one or several protrusions of said magnetic field concentrator cooperate with one or several indentations or openings in said protective element such that said magnetic field concentrator and said protective element is securely bonded together.

According to a second aspect it is provided a method for producing an induction sealing device comprising a main body, a magnetic field concentrator held in said main body and a conductive element, said method comprising placing said conductive element in an interior of said main body, and injection molding said magnetic field concentrator by gating magnetic field concentrator material into said interior of said main body via at least one hole in said main body, wherein one or several protrusions of said magnetic field concentrator cooperate with one or several indentations or openings in said main body such that said magnetic field concentrator and said main body is securely bonded together.

The at least one or several openings in said main body are used for gating material for forming said magnetic field concentrator into an interior of said main body.

The one or several protrusions of said magnetic field concentrator cooperate with one or several indentations or openings of said conductive element such that said magnetic field concentrator and said conductive element is securely bonded together.

The method may further comprise providing a protective element on said magnetic field concentrator, wherein one or several protrusions of said magnetic field concentrator cooperate with one or several indentations or openings in said protective element such that said magnetic field concentrator and said protective element is securely bonded together.

The protective element may be provided by injection molding.

According to a third aspect it is provided a filling machine comprising a sealing device according to the first aspect.

BRIEF DESCRIPTION OF THE DRAWINGS

The above, as well as additional objects, features and advantages of the present invention will be better understood through the following illustrative and non-limiting detailed description of different embodiments of the present invention, with reference to the appended drawings, wherein.

DETAILED DESCRIPTION

Figure 1:
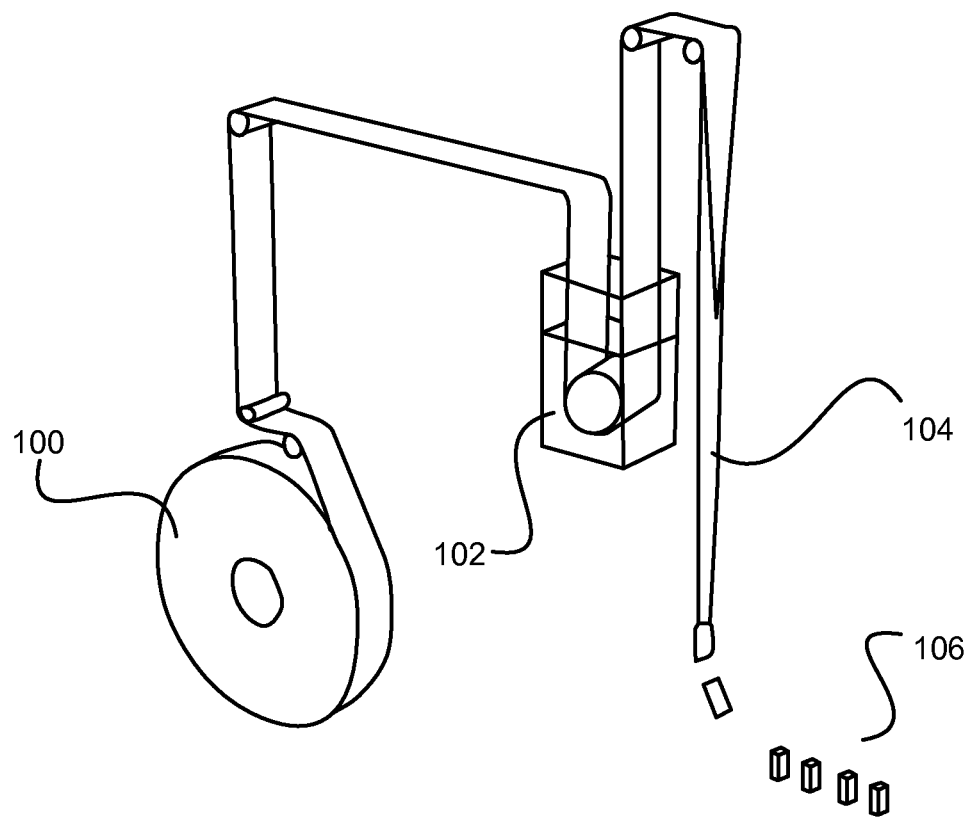
FIG. 1 illustrates a general principle for a roll fed carton packaging machine.

FIG. 1 generally illustrates the basic principle of a roll fed carton based packaging system for continuous packaging of liquid food products used in for example Tetra Brik® packaging systems. The packaging material is delivered in packaging material reels 100 to the dairy or other site where the filling machine is placed. Before being delivered the packaging material has been produced and printed in a so-called converting factory.

After unwinding the packaging material this is fed into a bath 102 in order to sterilize the packaging material, i.e. kill unwanted microorganisms. There are different ways to achieve this, but today one of the most commonly used methods is to use hydrogen peroxide. After being sterilized the packaging material is formed into a tube 104. More particularly, longitudinal ends are attached to each other continuously in a process often referred to as longitudinal sealing. When having formed a tube, this is filled with product, such as milk. Packages 106 are formed from the tube by making transversal sealings in an end of the tube and cutting off sealed portions as they are formed. In order to shape the packages different measures can be made during the transversal sealing as well as after the transversal sealing.

Figure 2:
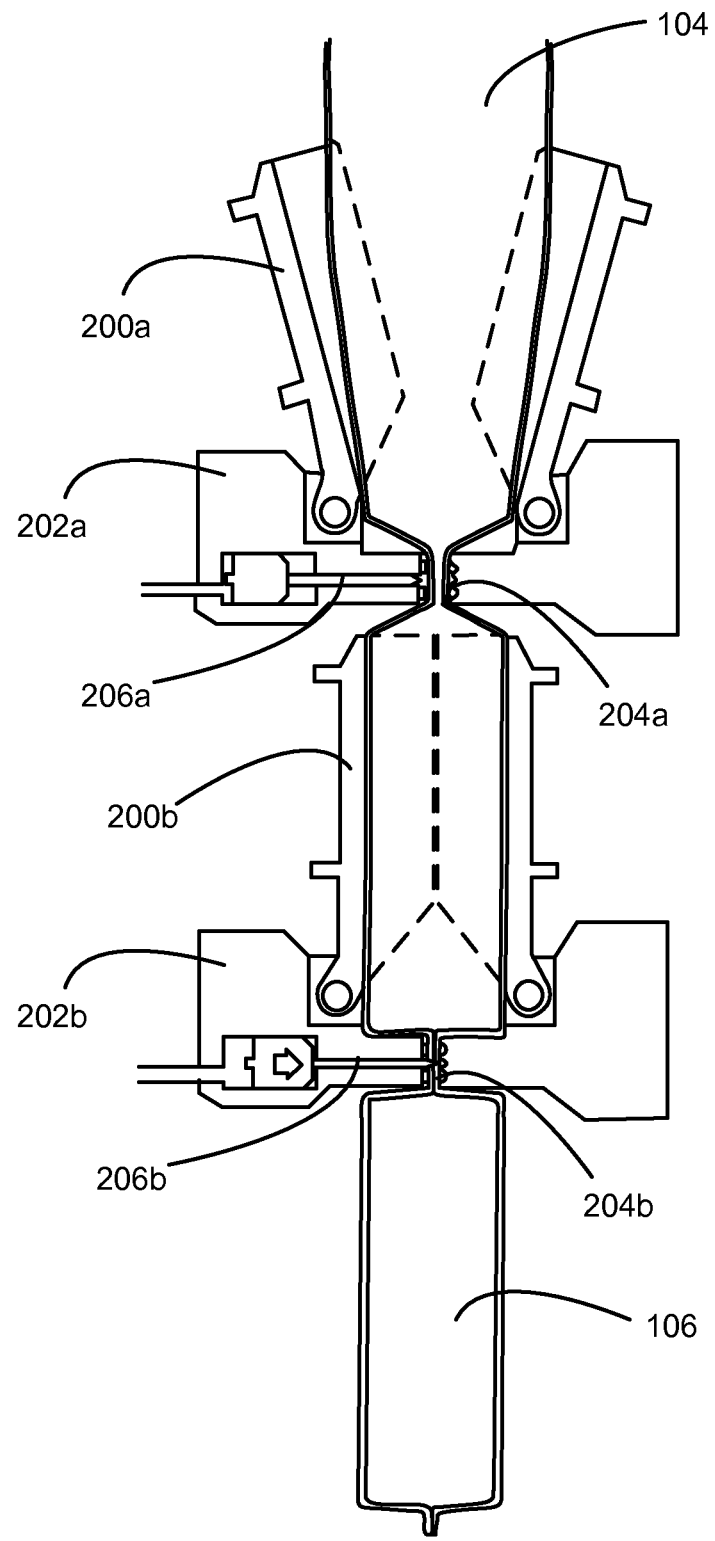
FIG. 2 illustrates an example of transversal sealing in a roll fed carton packaging machine.

FIG. 2 illustrates the transversal sealing in greater detail. In order to form packages from the tube 104 forming flaps 200a, 200b in combination with sealing jaws 202a, 202b can be used. Each sealing jaw 202a, 202b comprises a sealing device 204a, 204b and a knife 206a, 206b, or other cutting element, for separating a formed package from the tube.

The forming flaps and the sealing jaws are moved along with the tube and in FIG. 2 a first and a second stage are illustrated. In a first stage the forming flaps 200a is starting to form the tube into a shape of the package and the sealing jaws 202a is forming a transversal sealing using the sealing device 204a. In the second stage the forming flaps 200b are held in position such that the package shape is formed. Also in the second stage, the sealing jaws 202b is forming a transversal sealing using the sealing device 204b and after having made the transversal sealing a lower part of the tube, in this stage having both ends closed by transversal sealings, is cut off using the knife 206b.

In order to make sure that the sealings are properly made it is important that the packaging material is heated properly such that the plastic layers melt and that adequate pressure is applied. This means that the sealing device needs to be efficient in terms of inducing a current in the packaging material, but also be resistant in order to withstand the pressure involved when making the transversal sealing. In addition, in order to provide for that the production is cost efficient the life time of the sealing device should be long and quality issues should be kept at a minimum level.

Figure 3:
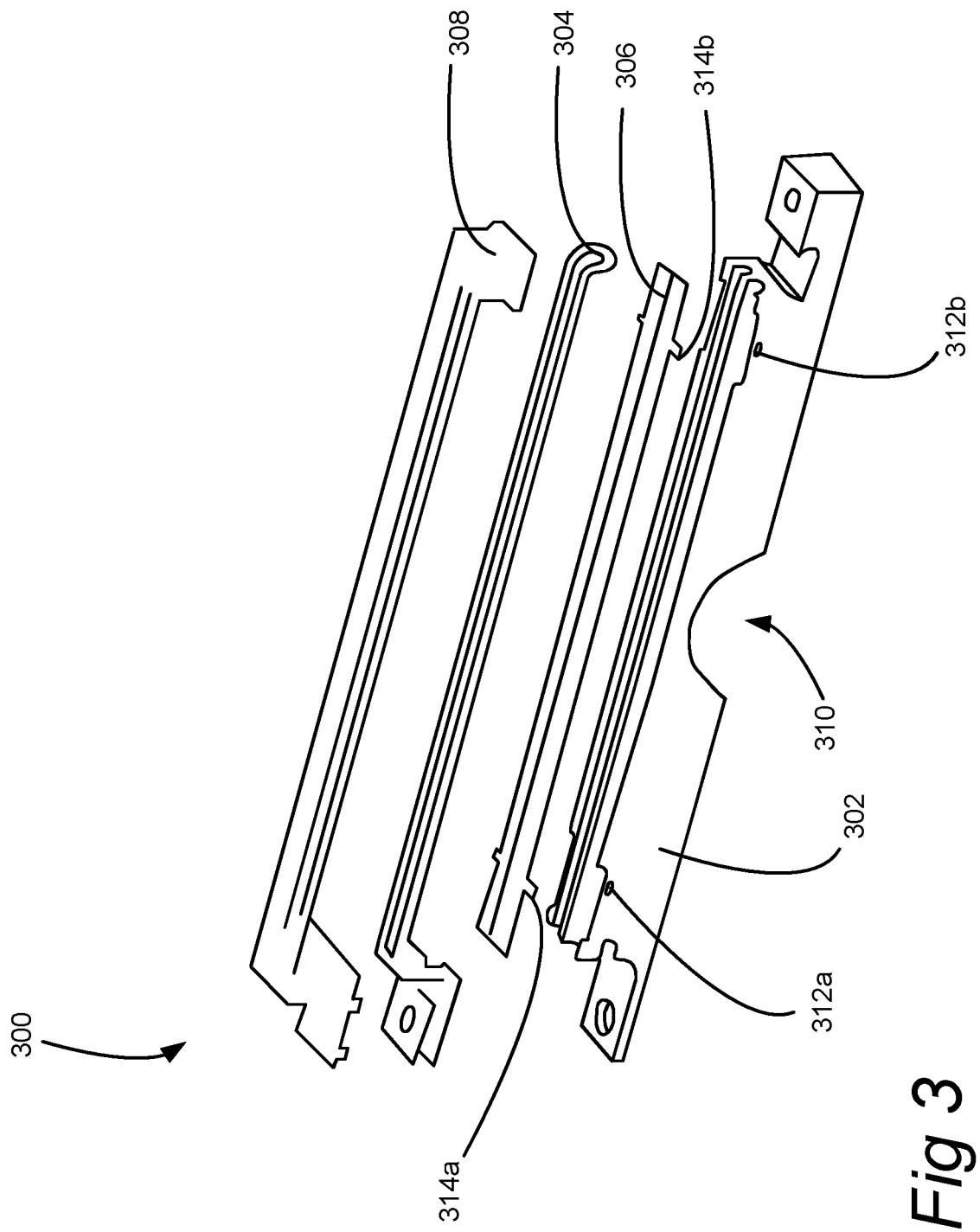
FIG. 3 illustrates a sealing device.

FIG. 3 illustrates an exploded view of a sealing device 300 that comprises four main parts—a support body 302, a conductive element 304, such as a coil, a magnetic field concentrator 306 and a protective member 308. In the example illustrated in FIG. 3 a cut out 310 is provided in order to be able to seal packaging material having opening devices, or other elements, attached.

Unlike sealing devices available today the magnetic field concentrator 306 is injection molded in the support body 302. In other words, the support body 302 serves as a mould when making the magnetic field concentrator 306. There are several advantages with having the magnetic field concentrator 306 made in this way instead of being pre-made before being placed in the support body, which is the standard procedure today. Firstly, production costs can be cut and thus a more cost efficient production can be achieved. Secondly, by having recesses in the conductive element and/or the support body the different parts of the sealing device are bonded together in an improved manner implying a more robust design.

In order to protect the conductive element 304 a protective member 308 can be used. The protective member 308 can be made of polyphenyle sulfide (PPS) and can be injection molded onto the magnetic field concentrator 306 such that the conductive element 304 is partly or fully enclosed and thereby protected from e.g. abrasive chemicals used for sterilizing the packaging material. In order to provide a flat surface on a front section of the sealing device, i.e. a section of the sealing device in use facing the packaging material, the protective element 308 can be treated such that the surface is made flat after having been injection molded, e.g. by grinding the surface of the front section.

In order to provide for that the molding of the magnetic field concentrator material is made in a controlled manner gating holes 312a, 312b can be provided in one or both side sections of the support body. Put differently, by having gating holes provided in the support body in this way the magnetic field concentrator material can be gated into the support body in such a way that the risk of having spaces not filled with magnetic field concentrator material can be reduced, implying increased production quality and less risk of having sealing devices not performing as expected.

As indicated above, an advantage of injection molding the magnetic field concentrator in the support body is that the different parts can be bonded together in an efficient way. In the exploded view of FIG. 3 this is exemplified by protrusions 314a, 314b formed when gating magnetic field concentrator material into the support body. These protrusions 314a, 314b provides for that the magnetic field concentrator is securely bonded to the support body.

In the example illustrated in FIG. 3 the cut-out 310 is provided in a mid section of the sealing device 300. This cut-out 310 is provided in order to be able to make transversal sealings for packaging material with opening devices attached. In other words, before forming the tube, opening devices are attached to the packaging material by using direct injection molding technology, gluing them to the packaging material or any other technology for attaching elements. Since the opening devices in this example is placed in the vicinity of an upper part of a package to be formed, thereby close to the transversal sealing area, the sealing device is adapted with a cut-out in order to provide the transversal sealing without interfering with the attached opening devices. In the example illustrated, the two gating holes 312a, 312b are provided on each side section. This set up is adapted to having the cut-out 310 placed in the mid section of the sealing device. In case there is no cut-out one gating hole in the mid section of the sealing device would be an option. Also, in case there is room both for a cut-out and a gating hole in the mid section without e.g. weakening the support body this is an option as well.

Figure 4A:
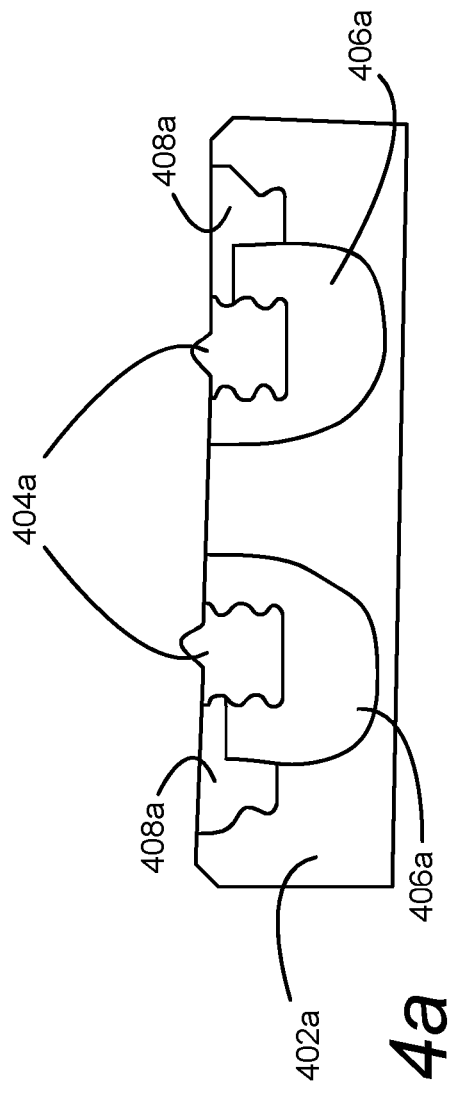
FIGS. 4a and 4b illustrate cross-sectional views of a first and second embodiment of the sealing device, respectively.
Figure 4B:
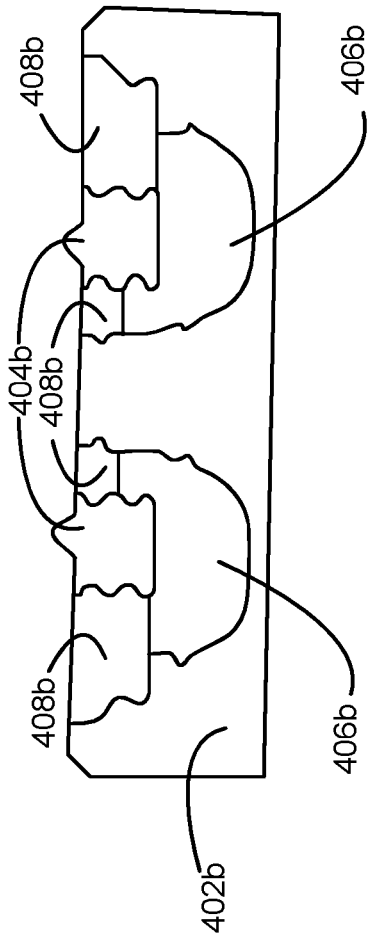

FIGS. 4a and 4b illustrate cross sectional views of a sealing device according to a first and second embodiment, respectively. In the first embodiment, illustrated in FIG. 4a, a support body 402a holds a conductive element 404a, a magnetic field concentrator 406a and a protective element 408a according to the first embodiment. In this embodiment the magnetic field concentrator 406a is covering side sections of the conductive element. In FIG. 4b, similar to the first embodiment, a support body 402b holds a conductive element 404b, a magnetic field concentrator 406b and a protective element 408b, but arranged according to the second embodiment. In this second embodiment, instead of having the magnetic field concentrator 406b covering lower parts of outer side sections of the conductive element, the protective member 408b is covering these side sections. Other embodiments are, as a skilled person would understand, possible and the two illustrated embodiments should be seen as examples.

Figure 5:
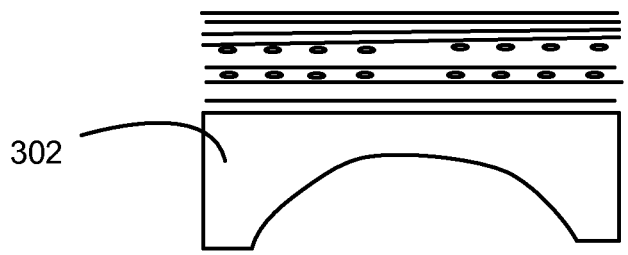
FIG. 5 illustrates a part of a sealing device with so-called anchor points.

As illustrated in FIG. 5 by example, in order to improve the bonding between the different parts of the sealing device, the support body may be provided with so-called anchor points, that is, indentations provided in the support body to improve attachment of the support body with the magnetic field concentrator and/or protective member.

Figure 6A:
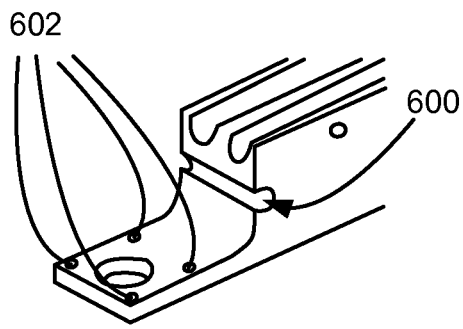
FIGS. 6a and 6b illustrate an example of a support body.
Figure 6B:
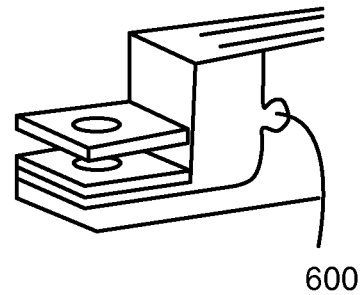

FIGS. 6a and 6b illustrate an example of how a support body can be designed in order to bond securely with a protective member, being injection molded. FIG. 6a illustrates the support body in isolation and FIG. 6b illustrates a sealing device based on the support body. In order to improve the bonding between the protective element and the support body a recess 600 can be used. Further, indentations 602 can be provided as well, or instead, in order to improve the bonding between the support body and the protective element.

Figure 7A:
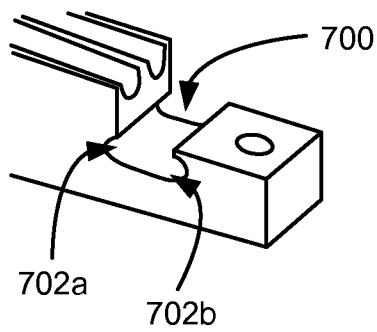
FIGS. 7a and 7b illustrate another example of a support body.
Figure 7B:
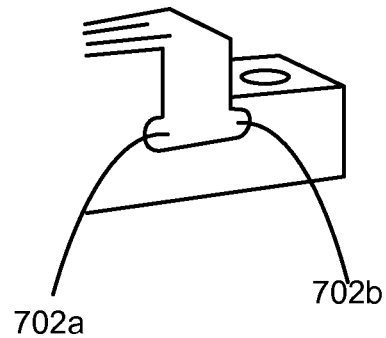

FIGS. 7a and 7b illustrate another example of how a support body can be designed in order to bond securely with a protective member, being injection molded. FIG. 7a illustrates the support body in isolation and FIG. 7b illustrates a sealing device based on the support body. In this example, in order to improve the bonding, a cut out 700 with recesses 702a, 702b in opposite directions are provided.

Figure 8:
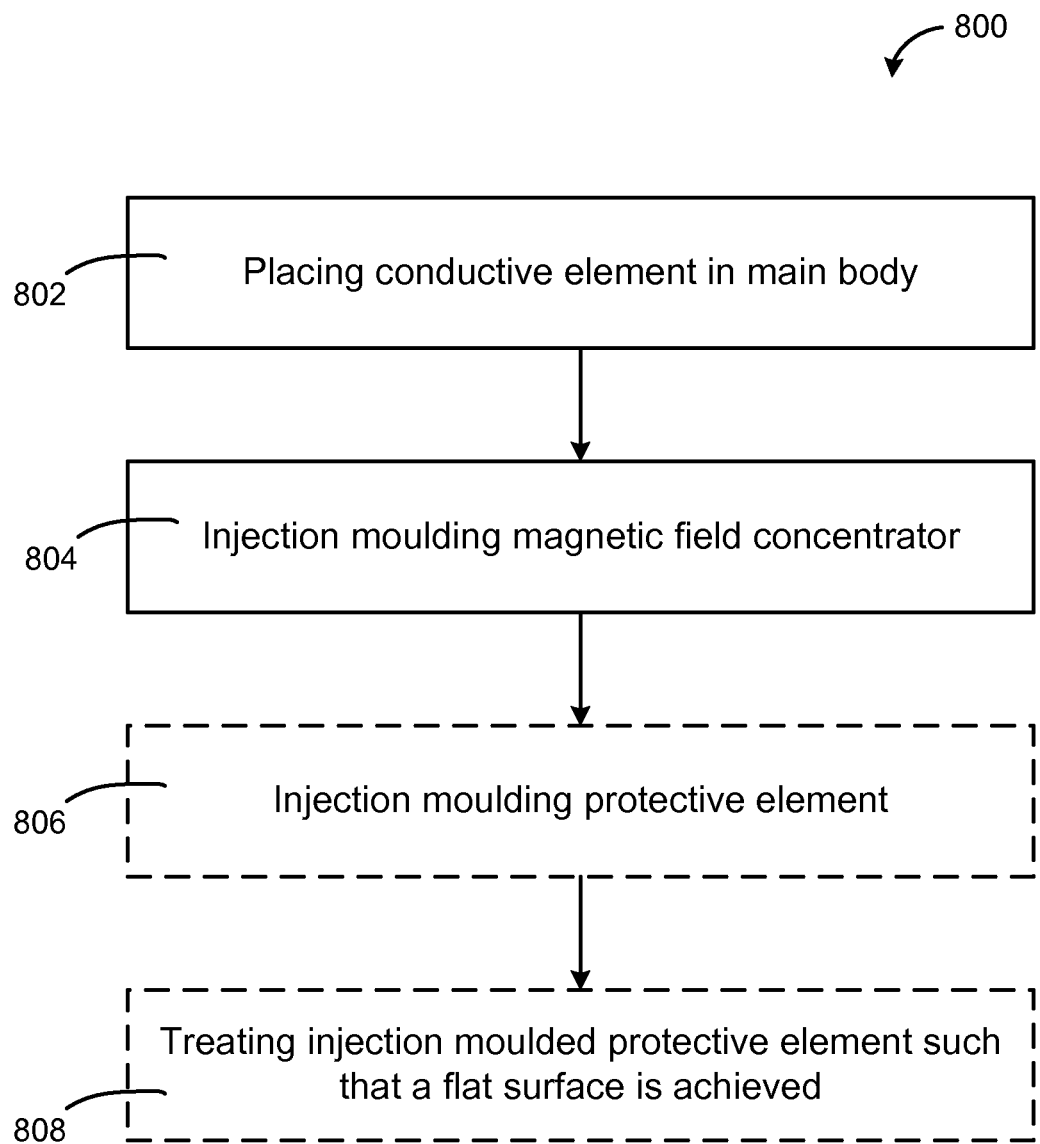
FIG. 8 is a flowchart illustrating a method for producing a device comprising a main body, a magnetic field concentrator and a conductive element.

FIG. 8 is a flowchart 800 illustrating a method for producing a device comprising a main body, a magnetic field concentrator and a conductive element.

In a first step 802 a conductive element, such as a coil, is placed in a main body, such as the support body illustrated in FIG. 3. Next, in a second step 804, a magnetic field concentrator can be injection molded by e.g. gating in magnetic field concentrator material into an interior of the main body as set forth above. Optionally, in a third step 806, a protective element can be injection molded. Further, also as an optional step, in a fourth step, the protective element may be treated such that a flat surface is achieved.

The invention has mainly been described above with reference to a few embodiments. However, as is readily appreciated by a person skilled in the art, other embodiments than the ones disclosed above are equally possible within the scope of the claimed subject matter according to the appended claims.

The invention claimed is:

1. An induction sealing device comprising:
   a main body;
   an injection molded magnetic field concentrator held in said main body; and
   a conductive element;
   wherein the main body is configured to act as a mold for the formation of the magnetic field concentrator during injection molding of the magnetic field concentrator, and wherein one or more protrusions of said magnetic field concentrator join with one or more indentations or openings in said main body such that said magnetic field concentrator and said main body are securely bonded together.

2. The device according to claim 1, wherein said one or more indentations or openings in said main body are configured to be used for gating material to form said magnetic field concentrator into an interior of said main body.

3. The device according to claim 1, wherein said main body is an elongated body, wherein said one or more indentations or openings are positioned in approximately a middle of said elongated body.

4. The device according to claim 1, wherein said main body is an elongated body having a cut out in a mid section of the elongated body, wherein said one or more indentations or openings are positioned in outer ends of said elongated body.

5. The device according to claim 3, wherein said main body includes a cut out in a mid section of said main body.

6. The device according to claim 1, wherein said one or more protrusions of said magnetic field concentrator join with one or more indentations or openings of said conductive element such that said magnetic field concentrator and said conductive element are securely bonded together.

7. The device according to claim 1, further comprising a protective element, wherein said one or more protrusions of said magnetic field concentrator cooperate with one or more indentations or openings in said protective element such that said magnetic field concentrator and said protective element are securely bonded together.

8. A method for producing an induction sealing device comprising a main body, a magnetic field concentrator held in said main body, and a conductive element, said method comprising:
   placing said conductive element in an interior of said main body; and injection molding said magnetic field concentrator by gating magnetic field concentrator material into said interior of said main body via at least one hole in said main body, such that the main body acts as a mold for the formation of the magnetic field concentrator;

wherein one or more protrusions of said magnetic field concentrator join with one or more indentations or openings in said main body such that said magnetic field concentrator and said main body are securely bonded together.

9. The method according to claim 8, wherein said one or more indentations or openings in said main body are used for gating material to form said magnetic field concentrator into said interior of said main body.

10. The method according to claim 8, wherein said one or more protrusions of said magnetic field concentrator cooperate join with one or more indentations or openings of said conductive element such that said magnetic field concentrator and said conductive element are securely bonded together.

11. The method according to claim 8, further comprising:
providing a protective element on said magnetic field concentrator;

wherein said one or more protrusions of said magnetic field concentrator cooperate with one or more indentations or openings in said protective element such that said magnetic field concentrator and said protective element are securely bonded together.

12. The method according to claim 11, wherein said protective element is provided by injection molding.

13. A filling machine comprising a sealing device according to claim 1.

* * * * *

UNITED STATES PATENT AND TRADEMARK OFFICE
CERTIFICATE OF CORRECTION

PATENT NO.       : 10,994,495 B2
APPLICATION NO.  : 15/779298
DATED            : May 4, 2021
INVENTOR(S)      : Karl Israelsson It is certified that error appears in the above-identified patent and that said Letters Patent is hereby corrected as shown below:

In the Drawings

In sheet 6 of 6, FIG. 8, reference numeral 808, Line 1, delete "moulded" and insert --molded--.

In the Specification

In Column 4, Line 48, delete "polyphenyle" and insert --polyphenylene--.

In the Claims

In Column 7, Lines 16-17, Claim 10, delete "cooperate join" and insert --join--.

Signed and Sealed this
Sixth Day of July, 2021

Drew Hirshfeld
*Performing the Functions and Duties of the
Under Secretary of Commerce for Intellectual Property and
Director of the United States Patent and Trademark Office*